Dec. 14, 1943.  P. N. MOBLEY  2,336,997
BOWLING INSTRUCTOR MEANS
Filed July 4, 1942  2 Sheets-Sheet 1
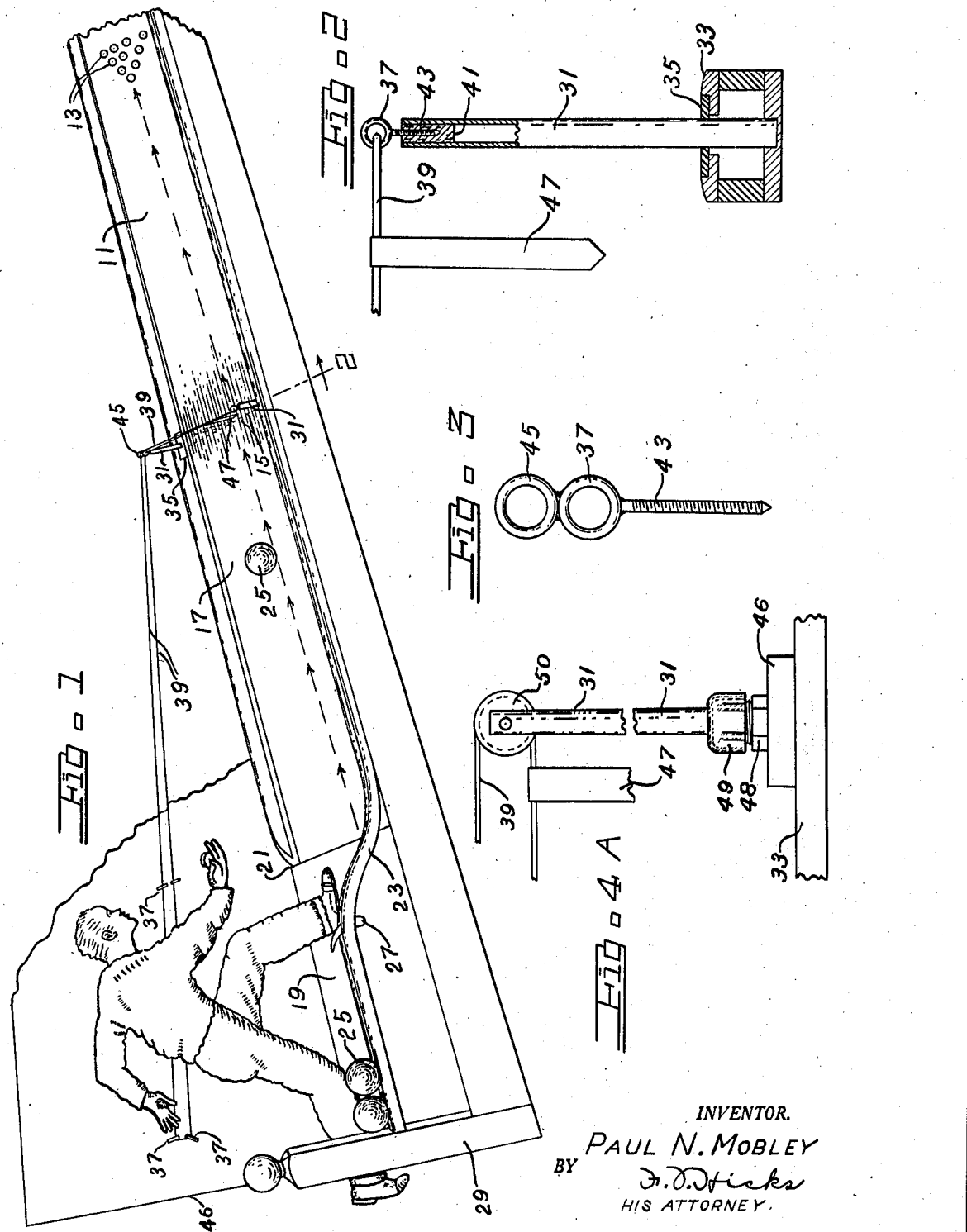
INVENTOR.
PAUL N. MOBLEY
BY
HIS ATTORNEY.

Dec. 14, 1943.   P. N. MOBLEY   2,336,997
BOWLING INSTRUCTOR MEANS
Filed July 4, 1942   2 Sheets-Sheet 2
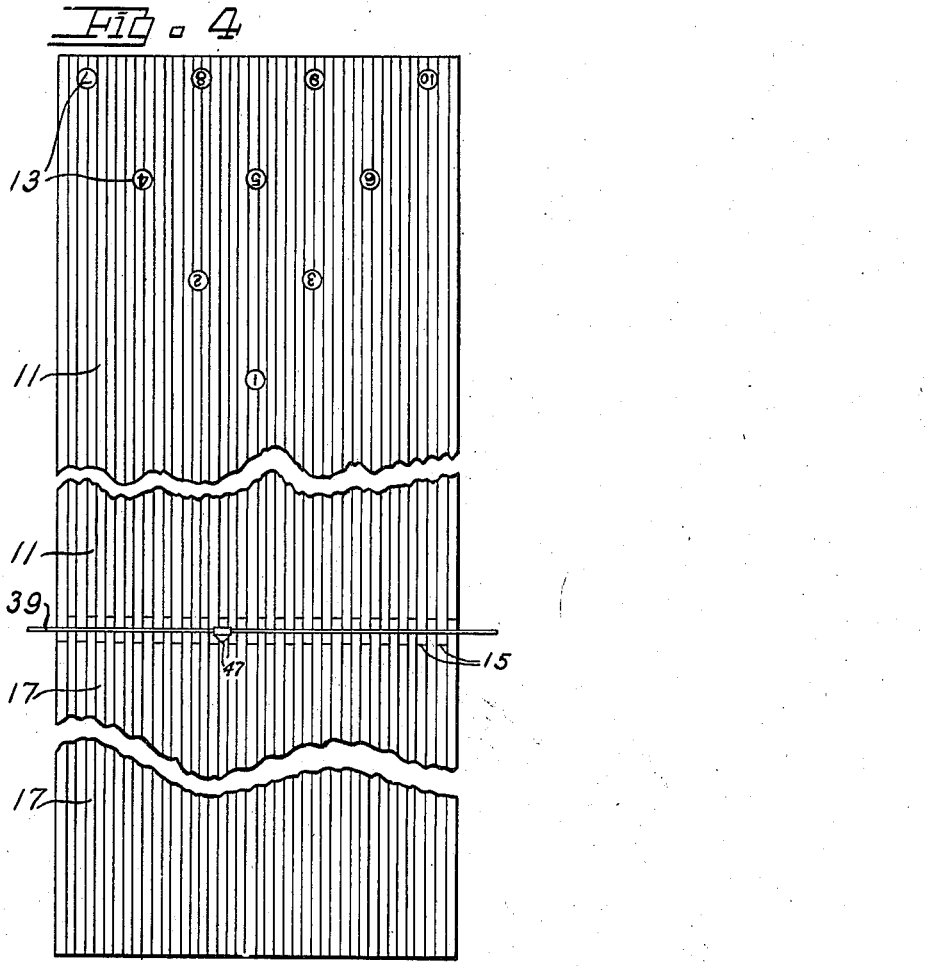
INVENTOR.
PAUL N. MOBLEY
BY
HIS ATTORNEY Patented Dec. 14, 1943

2,336,997

UNITED STATES PATENT OFFICE 2,336,997

BOWLING INSTRUCTOR MEANS

Paul N. Mobley, Detroit, Mich.

Application July 4, 1942, Serial No. 449,811

4 Claims. (Cl. 35—29)

My invention pertains to improved means for instructing bowlers to bowl or to improve their bowling.

Instructors teaching bowlers to bowl have found that it is very important to get the student started correctly at the beginning. When instructing a student where to lay the ball in order to make a certain desired spare or strike, an instructor often finds it helpful to walk down the alley to a point where the lighter colored maple flooring joins the darker colored pine flooring, and there to indicate the end of one of the boards in the joint to provide a positive designation of the particular point over which the ball must pass. This method of instructing the student, while very helpful to aid the student in correctly pointing the ball, is a great inconvenience and takes the instructor to a position where he can not observe the stance of the student which is also a very important point to be correctly trained.

It is accordingly an object of my invention to provide an improved means for instructing bowlers such that the instructor may effectively and conveniently instruct from a position back of the foul line and adjacent to the student where he is also able to coach the stance of the student.

It is also very desirable that the student be discouraged from looking at the pins as the target when laying down the bowling ball as this habit seriously detracts from his ability to concentrate on the precise angle which the ball must take in its initial travel. Consequently, it is an important object of the said invention to so interpose a sight between the student and the target pins that said sight will not only serve to indicate the point intermediate of the alley over which the ball must pass for a particular play, but will intercept the vision of the student in a manner causing him to fix his mind on such intermediate point as distinguished from the final target point.

It is also an object of my invention to provide bowling instruction apparatus comprising a transversely adjustable sighting signal mounted above an intermediate portion of the bowling alley and having operatively associated control means positioned adjacent the foul line from whence the sight can be actuated to provide visual manifestations, selected at will, for giving the student positive designations of the various points which a ball must pass at said intermediate portion of the alley in order to make a desired strike, spare or pin.

It is a further object of my invention to provide an improved simple means for aiding bowlers to learn to bowl or to improve their game by providing clear, positive and distinctive indications of transverse ball pointing positions at an intermediate point in the bowling alley less than one-third the length of the alley from the foul line.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Fig. 1 is a perspective view, partially broken away and diagrammatic, showing a bowling alley provided with bowling instruction apparatus for instructing and training bowlers in accordance with my invention, and the pins being omitted in order to more clearly show the positions of the pin spots;

Fig. 2 is an enlarged fragmentary sectional view, partially broken away, showing one of the side support means and the detachable mounting into the dividing board between alleys;

Fig. 3 is an enlarged view showing one of the double eyelet ring screws which I provide for stringing the two strands of the control cord in free running separated relation, from the sight to a convenient position adjacent the foul line;

Fig. 4 is a plan view representing a bowling alley with my bowling instruction apparatus; and Fig. 4A is a side elevational view showing a modified support and mounting.

Referring more specifically to Figs. 1, 2 and 3 of the drawings, I have illustratively disclosed my bowling instruction apparatus installed on a conventional alley comprising a section 11 of yellow pine flooring having the pin spots 13 thereon at one end and jointing at the other end 15 with a section 17 of maple flooring. Extending from the other end of the maple floor section 17 is an approach or runway 19, of any suitable wood flooring, and a foul line 21 therebetween extends transversely across the alley bed to and upon any walls or posts adjacent to or within reach of the bowler. In accordance with regulation specifications, it must be 60 feet from the foul line 21 to the No. 1 pin spot, with a tolerance of ½ inch permitted. The width of the alley bed must be not less than forty-one nor more than forty-two inches, the alley bed plus the gutters being a total of sixty inches in width. The pin spots 13 upon which the pins must be spotted must be 2¼ inches in diameter and spaced apart twelve inches from center to center. A ball return trough 23 returns the balls 25 to a position adjacent the player where the balls lodge between a ball catch 27 and a post 29.

In accordance with my invention I provide distinctive transversely variable sighting means for very clearly and positively designating any transverse point which may be selected at will at an intermediate portion of the alley. This is accomplished in a very simple and convenient manner by mounting a pair of removable support members 31 disposed vertically at corresponding points on opposite sides of the alley, and in such a manner that these may be quickly and conveniently installed or removed as desired. For this purpose, the dividing boards 33 between the alleys are provided with flush socket plates 35, as may be seen more clearly in Fig. 2, and the socket plates are apertured for receiving the lower ends of the supports 31, which may be quickly and conveniently installed or removed as desired. The supports are supported in vertical positions, and if preferred may be firmly secured in the respective socket plates 35 in any suitable manner.

The vertical supports 31 support eyelet rings 37 to tension and guide the movements of a cord or small cable 39 running freely therethrough. The vertical support members 31 are preferably tubular metal provided with a plug 41 of wood, or other yieldable material, at the upper end whereinto the screws 43 of the eyelet rings 37 may be conveniently turned. It is to be understood, however, that the support members 31 may be wooden dowels or other suitable support members, if desired. In order to intermediately support the double strands of the cord or cable 39, in separately spaced free running relation, a double eyelet is conveniently formed by welding a second ring 45 to the first eyelet ring 37, as represented in Fig. 3. In Fig. 1 the adjacent support 31 carries a single eyelet ring 37 and the more remote support 31 carries a double eyelet. Also a plurality of the double eyelets may be provided in a wall 46 or along the dividing board 33, at intervals extending back of the foul line 21 for conveniently guiding the control cable 39 to adjacent the player, as will be readily understood. A pair of the single eyelet rings may be used in spaced apart relation on the wall near the player to separate the strands of the cable. In some installations it is preferable to substitute small pulleys for the rings.

On one strand of the cable 39 stretched across the alley bed transversely between the vertical supports, a distinctive sight 47 is attached and suspended, which may be any element suitable for giving a clear and distinctive designation of a particular selected transverse point or position at which the player must point the ball to make a desired strike, spare or pin. For this purpose, a light flexible element such as a white ribbon, serves very effectively. The vertical supports 31 are preferably placed at opposite sides of the joints between the light colored maple flooring 11 and the darker colored pine flooring 17, so that the lower end of the sight 47 points clearly and definitely at the end of a selected one of the floor boards, which board ends can be distinguished rather clearly by the player. The lower end of the sight may be sufficiently spaced from the alley to allow a ball to pass immediately therebetween.

In practise the instructor conveniently manipulates the cable 39, from a point back of the foul line near the student, and moves the sight 47 transversely over the bed of the alley until the lower end of the marker hangs over and points down toward the designated point over which the ball must pass in order to make the desired strike, spare or pin. By moving this sight 47 to the No. 4 board it is possible to make the Nos. 1, 3, 6 and 10 pins and the following spares; No. 5 pin; the 5 and 8 pins; the 5 and 9 pins; the 1, 2, 4 and 7 pins; and the 5 and 10, a split. In order to make the Nos. 2, 4 and 7 pins the sight is moved over to the 5th board. With the sight at the 6th board, the 4 and 7 pins can be made. In order to make the No. 7 pin the indicator is moved over to the 7th board.

This makes it easy for the student to remember the designated transverse point or board end over which the ball should pass for each designated play and aids him in pointing or sighting the ball and getting correct direction. It saves the instructor many steps, permits him to remain where he can coach the stance of the student, and insures that the student will get the correct and right procedure from the start, at the same time helping him to overcome the undesirable tendency to fix his mind on the target pins. After the bowler has been correctly trained in this manner, which enables him to bowl correctly, he then knows which board end to aim at for a desired point in any bowling establishment to make any strike, spare or pin.

Fig. 4A shows a modified mounting comprising a base 46 which is secured on top of a dividing board 33, as by screws. Rising from the base 46 is provided a receptacle suitable for receiving the lower end of a support 31. For convenience this may preferably be an electrician's connector fitting 48, of a type commonly used for attaching conduit to a conduit box, and by turning the clamping nut 49 thereof, the support 31 may be conveniently secured or released. A pulley 50 may be journalled in the upper end of the vertical support 31 for guiding the cable 39 with reduced friction.

Aside from the specific embodiments of the invention herein shown and described, it will be understood that numerous details may be altered or omitted without departing from the spirit and scope of the invention as disclosed and claimed, and that I do not desire to limit the invention to the exact constructions herein set forth.

I claim:

1. The combination in bowling instruction apparatus of, a bowling alley, a sight mounted above an intermediate portion of the alley with the lower end of the sight sufficiently spaced from the alley to allow a ball to pass immediately therebetween, said sight being variable as to position transverse of said alley, and control means adjacent the foul line of said alley to determine the lateral position of said sight for the purposes specified.

2. Bowling instruction means comprising, a bowling alley, a sight, means supporting said sight for transverse movement over an intermediate portion of the bowling alley with the lower end of the sight sufficiently spaced from the alley to allow a ball to pass immediately therebetween, and control means extended adjacent the foul line for effecting lateral adjustment of said sight, for the purposes specified.

3. The combination in bowling instruction apparatus of, a bowling alley, a sight spaced above said alley sufficiently to allow a bowling ball to pass immediately therebetween, means supporting said sight for lateral adjustment intermediate the length of the alley, and manually operable adjusting means for said sight accessible from the vicinity of the foul line of the alley, for the purposes specified.

4. The combination in bowling instruction apparatus of, a bowling alley bed, a sight spaced above said alley with the lower end of the sight sufficiently spaced from the alley to allow a ball to pass immediately therebetween, a flexible elongated member supporting said sight, and means for guiding said member to move transversely over an intermediate portion of the alley bed, said elongated member extending to a point adjacent the foul line, whereby an instructor at that point may effect the lateral adjustment of said sight over the alley.

PAUL N. MOBLEY.